(12) United States Patent
Jung

(10) Patent No.: US 9,116,613 B2
(45) Date of Patent: Aug. 25, 2015

(54) MOBILE TERMINAL FOR SUPPORTING VARIOUS INPUT MODES AND CONTROL METHOD THEREOF

(75) Inventor: Jimyong Jung, Suwon (KR)

(73) Assignee: LG ELECTRONICS INC., Seoul (KR)

( * ) Notice: Subject to any disclaimer, the term of this patent is extended or adjusted under 35 U.S.C. 154(b) by 116 days.

(21) Appl. No.: 13/353,166

(22) Filed: Jan. 18, 2012

(65) Prior Publication Data

US 2012/0260208 A1    Oct. 11, 2012

(30) Foreign Application Priority Data

Apr. 6, 2011   (KR) .................. 10-2011-0031868

(51) Int. Cl.
G06F 3/048       (2013.01)
G06F 3/0488      (2013.01)

(52) U.S. Cl.
CPC ........ G06F 3/04883 (2013.01); G06F 3/04886 (2013.01)

(58) Field of Classification Search
CPC .................... G06F 3/04886; G06F 3/04883
USPC ........................ 715/773, 863; 345/156–178
See application file for complete search history.

(56) References Cited

U.S. PATENT DOCUMENTS

| | | | |
|---|---|---|---|
| 2003/0001899 A1* | 1/2003 | Partanen et al. | 345/800 |
| 2007/0115146 A1* | 5/2007 | Jo | 341/22 |
| 2010/0020033 A1* | 1/2010 | Nwosu | 345/173 |
| 2010/0315358 A1* | 12/2010 | Chang et al. | 345/173 |
| 2011/0157028 A1* | 6/2011 | Stallings et al. | 345/173 |
| 2012/0117506 A1* | 5/2012 | Koch et al. | 715/773 |
| 2012/0249425 A1* | 10/2012 | Colley | 345/163 |

OTHER PUBLICATIONS

Chinese Patent ID CN 1991719; Title: Mobile terminal having virtual keyboard and hand-write synergic input function; Application No. 200510135442.8; Date Applied: Dec. 28, 2005; Date Published: Jul. 4, 2007.*

* cited by examiner

*Primary Examiner* — Dino Kujundzic
*Assistant Examiner* — Patrick Fasang
(74) *Attorney, Agent, or Firm* — Lee, Hong, Degerman, Kang & Waimey

(57) ABSTRACT

The present disclosure relates to a mobile terminal, and more particularly, to a mobile terminal and control method thereof capable of performing a handwriting input. A mobile terminal according to an embodiment of the present invention may include a display unit configured to display a virtual keypad, and a controller configured to implement a handwriting mode when a drag across the virtual keypad is sensed, and recognize a trace of the drag as a handwriting character when the drag is completed in the handwriting mode.

14 Claims, 16 Drawing Sheets

MOBILE TERMINAL FOR SUPPORTING VARIOUS INPUT MODES AND CONTROL METHOD THEREOF

CROSS-REFERENCE TO RELATED APPLICATIONS

Pursuant to 35 U.S.C. §119(a), this application claims the benefit of earlier filing date and right of priority to Korean Application No. 10-2011-0031868, filed on Apr. 6, 2011, the contents of which is incorporated by reference herein in its entirety.

BACKGROUND OF THE INVENTION

1. Field of the Invention

The present disclosure relates to a mobile terminal, and more particularly, to a mobile terminal and control method thereof capable of performing a handwriting input.

2. Description of the Related Art

Terminals can be classified into a mobile terminal and a stationary terminal based on its mobility. Furthermore, terminals can be further classified into a handheld terminal and a vehicle mount terminal based on whether or not it can be directly carried by a user.

As it becomes multifunctional, the mobile terminal can be allowed to capture still or moving images, play music or video files, play games, receive broadcast and the like, so as to be implemented as an integrated multimedia player. Moreover, in order to support and enhance the function of the terminal, the improvement of the terminal may be considered in the aspect of structure or software.

Owing to the foregoing improvement, terminals have been evolved to support various input modes. As a result, a user can possess user interfaces suitable to his or her taste.

SUMMARY OF THE INVENTION

An object of the present invention is to provide a mobile terminal and control method thereof capable of reducing the user's manipulation when performing an input operation onto a touch screen.

A mobile terminal according to an embodiment of the present invention may include a display unit configured to display a virtual keypad, and a controller configured to implement a handwriting mode when a drag across the virtual keypad is sensed, and recognize a trace of the drag as a handwriting character when the drag is completed in the handwriting mode.

The controller may release the handwriting mode and recognize a character mapping to one key input when the one key input is sensed by a touch to the virtual keypad in the handwriting mode.

The controller may recognize the trace of the drag as a control command when the drag is started in a first input area of the virtual keypad, and recognize the trace of the drag as the handwriting character when the drag is started in a second input area of the virtual keypad.

The first input area may include keys located at an edge within the virtual keypad, and the second input area may include keys located at an inner side of the first input area.

The controller may change characters mapping to keys on the virtual keypad based on the control command.

The controller may generate list information on input modes based on the control command.

When the handwriting mode is carried out, a semi-transparent window may be displayed on the virtual keypad.

When the handwriting mode is carried out, a trace of the drag may be displayed on the virtual keypad A method of controlling a mobile terminal according to an embodiment of the present invention may include displaying a virtual keypad, implementing a handwriting mode when a drag across the virtual keypad is sensed, and recognizing a trace of the drag as a handwriting character when the drag is completed in the handwriting mode.

The control method may further include releasing the handwriting mode and recognizing a character mapping to one key input when the one key input is sensed by a touch to the virtual keypad while implementing the handwriting mode.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
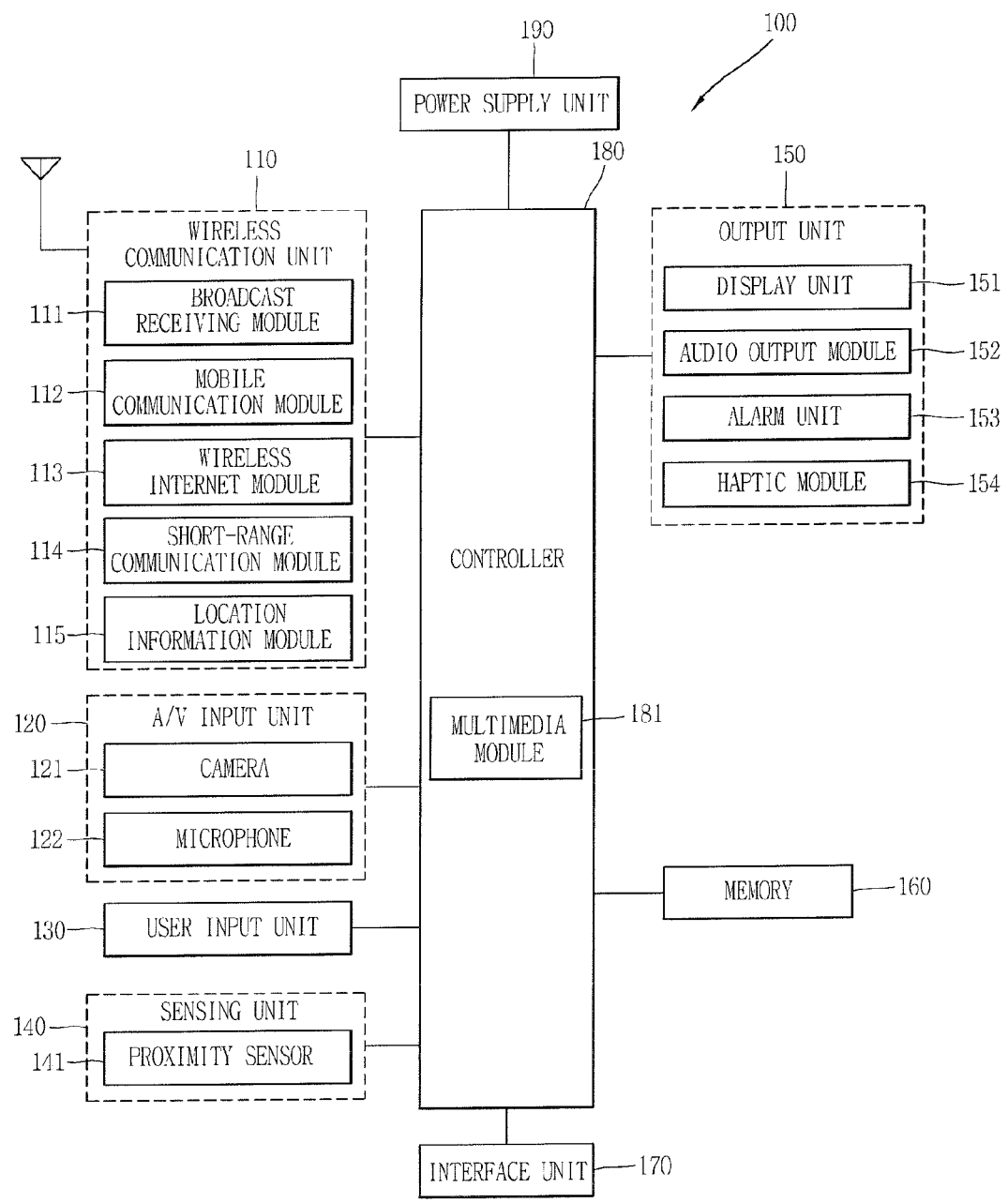
FIG. 1 is a block diagram illustrating a mobile terminal according to an embodiment of the present invention.

FIG. 1 is a block diagram illustrating a mobile terminal 100 associated with an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile terminal may be implemented with greater or less number of elements than those illustrated elements.

Hereinafter, the constituent elements 110-190 of the mobile terminal 100 will be described in sequence.

The wireless communication unit 110 typically includes one or more elements allowing radio communication between the mobile terminal 100 and a wireless communication system, or allowing radio communication between radio communication the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel. Here, the broadcast associated information may mean information regarding a broadcast channel, a broadcast program, a broadcast service provider, and the like. The broadcast associated information may also be provided through a mobile communication network, and in this case, the broadcast associated information may be received by the mobile communication module 112. The broadcast signal and/or broadcast-associated information received through the broadcast receiving module 111 may be stored in the memory 160.

The mobile communication module 112 transmits and/or receives a radio signal to and/or from at least one of a base station, an external terminal and a server over a mobile communication network. Here, the radio signal may include a voice call signal, a video call signal and/or various types of data according to text and/or multimedia message transmission and/or reception.

The wireless Internet module 113, as a module for supporting wireless Internet access, may be built-in or externally installed to the mobile terminal 100. Here, it may be used a wireless Internet technique including a WLAN (Wireless LAN), Wi-Fi, Wibro (Wireless Broadband), Wimax (World Interoperability for Microwave Access), HSDPA (High Speed Downlink Packet Access), and the like.

The short-range communication module 114 is a module for supporting a short-range communication. Here, it may be used a short-range communication technology including Bluetooth, Radio Frequency IDentification (RFID), Infrared Data Association (IrDA), Ultra WideBand (UWB), ZigBee, and the like.

The location information module 115 is a module for checking or acquiring a location of the mobile terminal, and there is a global positioning system (GPS) module as a representative example.

Referring to FIG. 1, the A/V (audio/video) input unit 120 receives an audio or video signal, and the A/V (audio/video) input unit 120 may include a camera 121, a microphone 122, and the like. The camera 121 processes an image frame such as a still or moving image obtained by an image sensor in a video phone call or image capturing mode. The processed image frame may be displayed on a display unit 151. The image frames processed by the camera 121 may be stored in the memory 160 or transmitted to an external device through the wireless communication unit 110. Two or more cameras 121 may be provided according to the use environment of the mobile terminal.

The microphone 122 receives an external audio signal through a microphone in a phone call mode, a recording mode, a voice recognition mode, and the like, and processes the audio signal into electrical voice data. The processed voice data processed by the microphone 122 may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a key pad, a dome switch, a touch pad (pressure/capacitance), a jog wheel, a jog switch, and the like.

The sensing unit 140 detects a current status of the mobile terminal 100 such as an opened or closed status of the mobile terminal 100, a location of the mobile terminal 100, an orientation of the mobile terminal 100, and the like, and generates a sensing signal for controlling the operation of the mobile terminal 100. For example, when the mobile terminal 100 is a slide phone type, it may sense an opened or closed status of the slide phone. Furthermore, the sensing unit 140 takes charge of a sensing function associated with whether or not power is supplied from the power supply unit 190, or whether or not an external device is coupled to the interface unit 170.

The sensing unit 140 may include a proximity sensor 141. Furthermore, the sensing unit 140 may include a touch sensor (not shown) for sensing a touch operation to the display unit 151.

The touch sensor may be implemented as a touch film, a touch sheet, a touch pad, and the like. The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When the display unit 151 and the touch sensor have a layered structure therebetween, the display unit 151 may be used as an input device rather than an output device. The display unit 151 may be referred to as a "touch screen".

When there is a touch input through the touch screen, the corresponding signals are sent to a touch controller (not shown). The touch controller processes the received signals, and then transmits data corresponding to the processed signals to the controller 180. Accordingly, the controller 180 may sense which region of the display unit 151 has been touched.

When the touch screen is implemented with a capacitance type, it may be configured such that the proximity of a detection subject is sensed by changes of an electromagnetic field. In this case, the touch screen may be categorized into a proximity sensor 141.

The proximity sensor 141 refers to a sensor to detect the presence or absence of a detection subject using an electromagnetic field or infrared rays without a mechanical contact. The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on.

Hereinafter, for the sake of convenience of brief explanation, a status that the pointer is positioned to be proximate onto the touch screen without contact will be referred to as "proximity touch", whereas a status that the pointer substantially comes in contact with the touch screen will be referred to as "contact touch". For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The output unit 150 is configured to provide an output associated with visual sense, auditory sense, tactile sense, and the like, and the output unit 150 may include the display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

At least one display (or display element) included in the display unit 151 may be configured with a transparent or optical transparent type to allow viewing of the exterior through the display unit. It may be referred to as a transparent display. An example of the typical transparent displays may include a transparent LCD (TOLED), and the like. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to the functions performed in the mobile terminal 100 (e.g., sound alarming a call received or a message received, and so on). The audio output module 152 may include a receiver, a speaker, a buzzer, and so on.

The alarm unit 153 outputs signals notifying occurrence of events from the mobile terminal 100. The events occurring from the mobile terminal 100 may include call received, message received, key signal input, touch input, and so on. The alarm unit 153 may output not only video or audio signals, but also other types of signals such as signals notifying occurrence of events in a vibration manner. Since the video or audio signals can be output through the display unit 151 or the audio output module 152, the display unit 151 and the audio output module 152 may be categorized into part of the alarm unit 153.

The haptic module 155 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects through a user's direct contact, or a user's muscular sense using a finger or a hand. The haptic module 154 may be implemented in two or more in number according to the configuration of the mobile terminal 100.

The memory 160 may store a program for processing and controlling the controller 180. Alternatively, the memory 160 may temporarily store input/output data (e.g., phonebook, messages, still images, videos, and the like). Also, the memory 160 may store data related to various patterns of vibrations and sounds outputted upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate in association with a web storage which performs the storage function of the memory 160 on the Internet.

The interface unit 170 may generally be implemented to interface the portable terminal with external devices connected to the mobile terminal 100. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component. The controller 180 can perform a pattern recognition processing so as to recognize writing or drawing input carried out on the touch screen as text or image.

The power supply unit 190 receives external and internal power to provide power required for various components under the control of the controller 180.

Various embodiments described herein may be implemented in a computer or similar device readable medium using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. In some cases, such embodiments may be implemented in the controller 180 itself.

For software implementation, the embodiments such as procedures or functions may be implemented together with separate software modules that allow performing of at least one function or operation. Software codes can be implemented by a software application written in any suitable programming language. The software codes may be stored in the memory 160 and executed by the controller 180.

Hereinafter, the processing method of a user input to the mobile terminal 100 will be described.

The user input unit 130 is manipulated to receive a command for controlling the operation of the portable terminal 100, and may include a plurality of manipulation units. The manipulation units may be commonly designated as a manipulating portion, and any method may be employed if it is a tactile manner allowing the user to perform manipulation with a tactile feeling.

Various kinds of visual information may be displayed on the display unit 151. The visual information may be displayed in a form of characters, numerals, symbols, graphics, or icons, or may be implemented in three-dimensional solid images. For an input of the visual information, at least one of the characters, numerals, symbols, graphics, or icons may be displayed with a predetermined arrangement so as to be implemented in a form of keypad. Such a keypad may be referred to as a so-called "soft key."

The display unit 151 may operate on an entire region or operate by dividing into a plurality of regions. In case of the latter, the plurality of regions may be configured to operate in an associative way. For example, an output window and an input window may be displayed on the upper portion and lower portion of the display unit, respectively. The output window and the input window may be regions allocated to output or input information, respectively. A soft key on which numerals for inputting phone numbers or the like are displayed is outputted on the input window. When the soft key is touched, numerals corresponding to the touched soft key are displayed on the output window. When the manipulating unit is manipulated, a call connection for the phone number displayed on the output window is attempted or a text displayed on the output window may be input to an application.

The display unit 151 or the touch pad may be configured to sense a touch scroll. The user may move an object displayed on the display unit 151, for example, a cursor or pointer placed on an icon, by scrolling the display unit 151 or the touch pad. Moreover, when a finger is moved on the display unit 151 or the touch pad, a path being moved by the finger may be visually displayed on the display unit 151. It may be useful to edit an image displayed on the display unit 151.

In order to cope with a case where the display unit 151 and the touch pad are touched together within a predetermined period of time, one function of the mobile terminal 100 may be executed. As a case of being touched together, there is a case when the user clamps a terminal body of the mobile terminal 100 using the thumb and forefinger. For one of the functions executed in the mobile terminal 100, there may be an activation or de-activation for the display unit 151 or the touch pad.

Figure 2A:
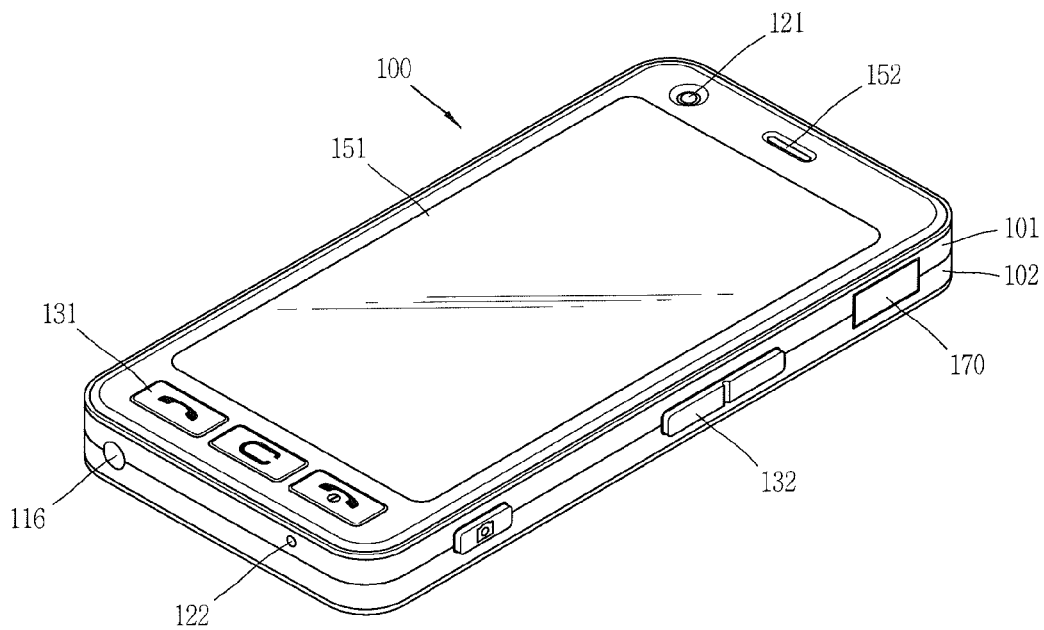
FIGS. 2A and 2B are perspective views illustrating the external appearance of a mobile terminal according to an embodiment of the present invention.
Figure 2B:
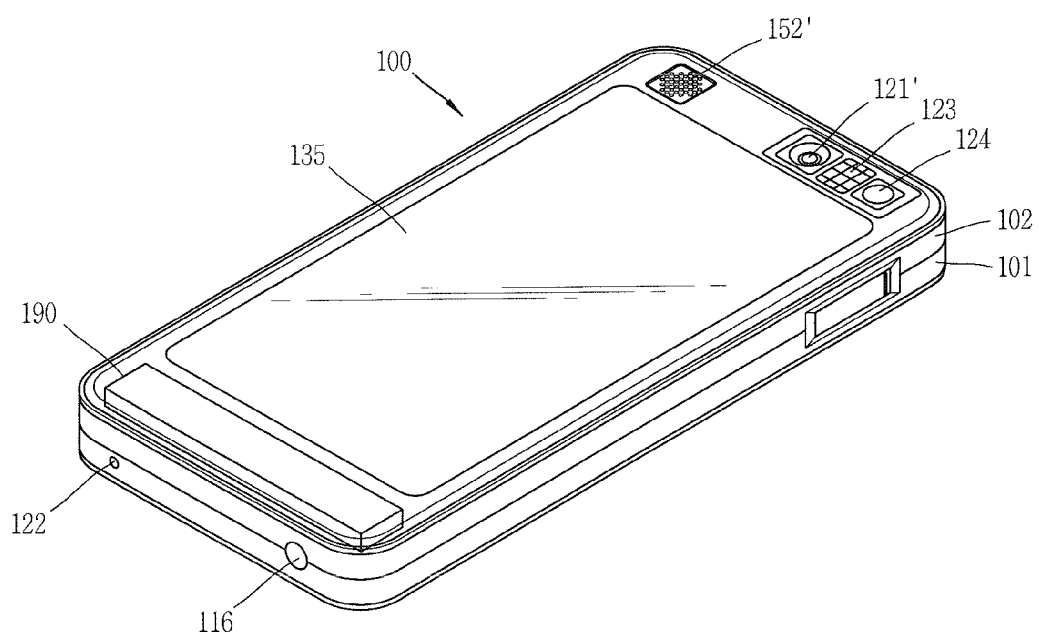

FIGS. 2A and 2B are perspective views illustrating the external appearance of a mobile terminal 100 associated with the present invention. FIG. 2A illustrates a front surface and one lateral surface of the mobile terminal 100, and FIG. 2B illustrates a rear surface and the other lateral surface of the mobile terminal 100.

Referring to FIG. 2A, the mobile terminal 100 disclosed herein is provided with a bar-type terminal body. However, the present invention is not only limited to this type of terminal, but also applicable to various structures of terminals such as slide type, folder type, swivel type, swing type, and the like, in which two and more bodies are combined with each other in a relatively movable manner.

The terminal body includes a case (casing, housing, cover, etc.) forming an appearance of the terminal. In this embodiment, the case may be divided into a front case 101 and a rear case 102. At least one middle case may be additionally disposed between the front case 101 and the rear case 102.

The cases may be formed by injection-molding a synthetic resin or may be also formed of a metal material such as stainless steel (STS), titanium (Ti), or the like.

A display unit 151, an audio output module 152, a camera 121, a user input unit 130 (refer to FIG. 1), a microphone 122, an interface 170, and the like may be arranged on the terminal body, mainly on the front case 101.

The display unit 151 occupies a most portion of the front case 101. The audio output unit 152 and the camera 121 are disposed on a region adjacent to one of both ends of the display unit 151, and the user input unit 131 and the microphone 122 are disposed on a region adjacent to the other end thereof. The user interface 132 and the interface 170, and the like, may be disposed on a lateral surface of the front case 101 and the rear case 102.

The user input unit 130 is manipulated to receive a command for controlling the operation of the portable terminal 100. The user input unit 130 may include a plurality of manipulation units 131, 132.

A first or a second manipulating unit 131, 132 may receive various commands. The first manipulation unit 131 may be used to receive a command, such as start, end, scroll, or the like, and the second manipulation unit 132 may be used to receive a command, such as controlling a volume level being outputted from the audio output unit 152, or switching it into a touch recognition mode of the display unit 151.

Referring to FIG. 2B, a camera 121' may be additionally mounted on a rear surface of the terminal body, namely, the rear case 102. The camera 121' has an image capturing direction, which is substantially opposite to the direction of the camera 121 (refer to FIG. 2A), and may have different pixels from those of the first video input unit 121.

For example, it is preferable that the camera 121 has a relatively small number of pixels enough not to cause a difficulty when the user captures his or her own face and sends it to the other party during a video call or the like, and the camera 121' has a relatively large number of pixels since the user often captures a general object that is not sent immediately.

Meanwhile, the cameras 121, 121' may be provided in the terminal body in a rotatable and popupable manner.

Furthermore, a flash 123 and a mirror 124 may be additionally disposed adjacent to the camera 121'. The flash 123 illuminates light toward an object when capturing the object with the camera 121'. The mirror 124 allows the user to look at his or her own face, or the like, in a reflected way when capturing himself or herself (in a self-portrait mode) by using the camera 121'.

Furthermore, an audio output unit 152' may be additionally disposed on a rear surface of the terminal body. The audio output unit 152' together with the audio output unit 152 (refer to FIG. 2A) can implement a stereo function, and it may be also used to implement a speaker phone mode during a phone call.

Furthermore, an antenna 116 for receiving broadcast signals may be additionally disposed on a lateral surface of the terminal body. The antenna 116 constituting a broadcast receiving module 111 (refer to FIG. 1) may be provided so as to be pulled out from the terminal body.

Furthermore, a power supply unit 190 for supplying power to the portable terminal 100 may be mounted on the terminal body. The power supply unit 190 may be configured so as to be incorporated in the terminal body, or directly detachable from the outside of the terminal body.

A touch pad 135 for detecting a touch may be additionally mounted on the rear case 102. The touch pad 135 may be also configured with an optical transmission type, similarly to the display unit 151 (refer to FIG. 2A). Furthermore, a rear side display unit for visual information may be also additionally mounted on the touch pad 135. In this case, information displayed on both surfaces of the front side display unit and the rear side display unit may be controlled by the touch pad 135.

The touch pad 135 may be operated in conjunction with the display unit 151. The touch pad 135 may be disposed in parallel at a rear side of the display unit 151. The touch pad 135 may have the same size as or a smaller size than the display unit 151.

Hereinafter, in a mobile terminal 100 according to an embodiment of the present invention, a mechanism for switching an input mode or implementing a control command based on an input pattern onto the display unit 151 will be described.

Figure 3:
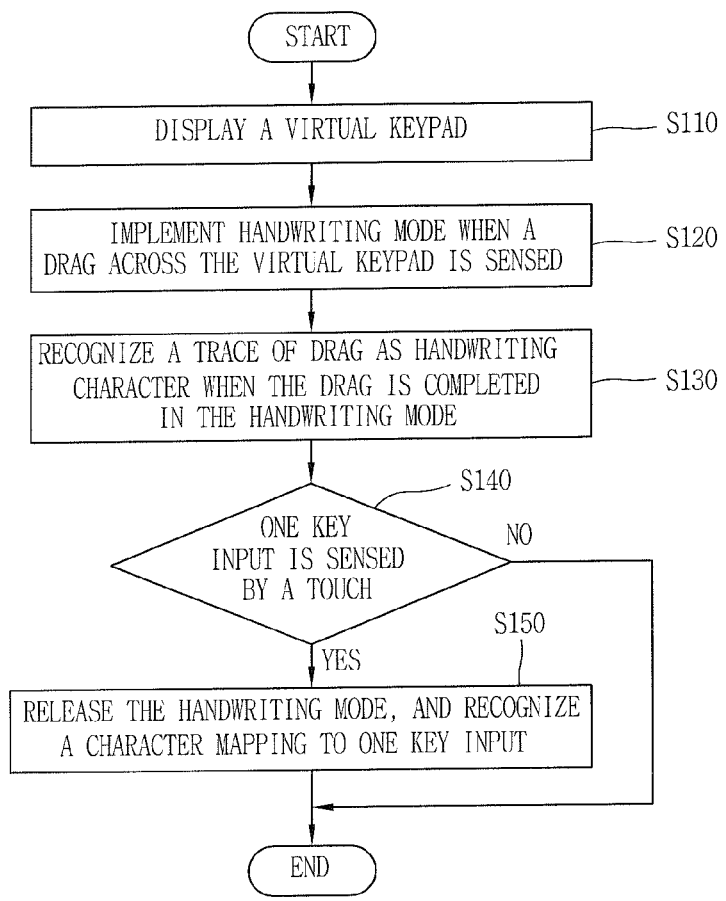
FIG. 3 is a flow chart for explaining an embodiment of a control method applied to the mobile terminal illustrated in FIG. 1.

FIG. 3 is a flow chart for explaining an embodiment of a control method applied to the mobile terminal 100 illustrated in FIG. 1.

Referring to FIG. 3, a control method according to an embodiment may include the step of displaying a virtual keypad on the display unit 151 (refer to FIG. 1) (S110). At least one character may be mapped (assigned) to each key of the virtual keypad. Furthermore, a character mapping to each key on the virtual keypad may be changed according to the input mode. For example, the character mapping to each key on the virtual keypad may be changed from any one of a Korean character, an English character, a symbol, a numeral, and the like to another one thereof.

The sensing unit 140 (refer to FIG. 1) may sense an input performed by a touch operation onto the virtual keypad, for example, a tap, a multi tap, a drag, a swipe, a flick, or the like. The controller 180 (refer to FIG. 1) may perform a control operation according to the sensed input.

When a drag across the virtual keypad is sensed, the step of implementing a handwriting mode (S120) is progressed. More specifically, When a drag is sensed, it may be immediately switched to a handwriting mode even if a command for switching to another mode, for example, from a key input mode to a handwriting mode, is not separately received. It means that the virtual keypad can be used as an input means compatible to both a key input mode and a handwriting mode.

Here, key input mode may denote a state in which a key input performed by a touch operation can be recognized as a mapping character. Furthermore, handwriting mode may denote a state in which an input performed by a touch operation (for example, drag) can be recognized as a handwriting character.

When a drag is completed in the handwriting mode, the step of recognizing a trace of the drag as a handwriting character (S130) is progressed. The recognized handwriting character may be displayed on the display unit 151.

The control method according to an embodiment may include the step of determining whether or not one key input is sensed by a touch to the virtual keypad in a handwriting mode (S140).

When one key input is sensed in the handwriting mode, the step of releasing a handwriting mode (for example, switching to a key input mode), and recognizing a character mapping to one key input (S150) is progressed. When one key input is not sensed in a handwriting mode (for example, when a drag continues to be sensed or repetitive drags are sensed), the handwriting mode continues to be carried out. This means that a handwriting mode can be maintained until one key input is sensed in the handwriting mode.

Figure 4:
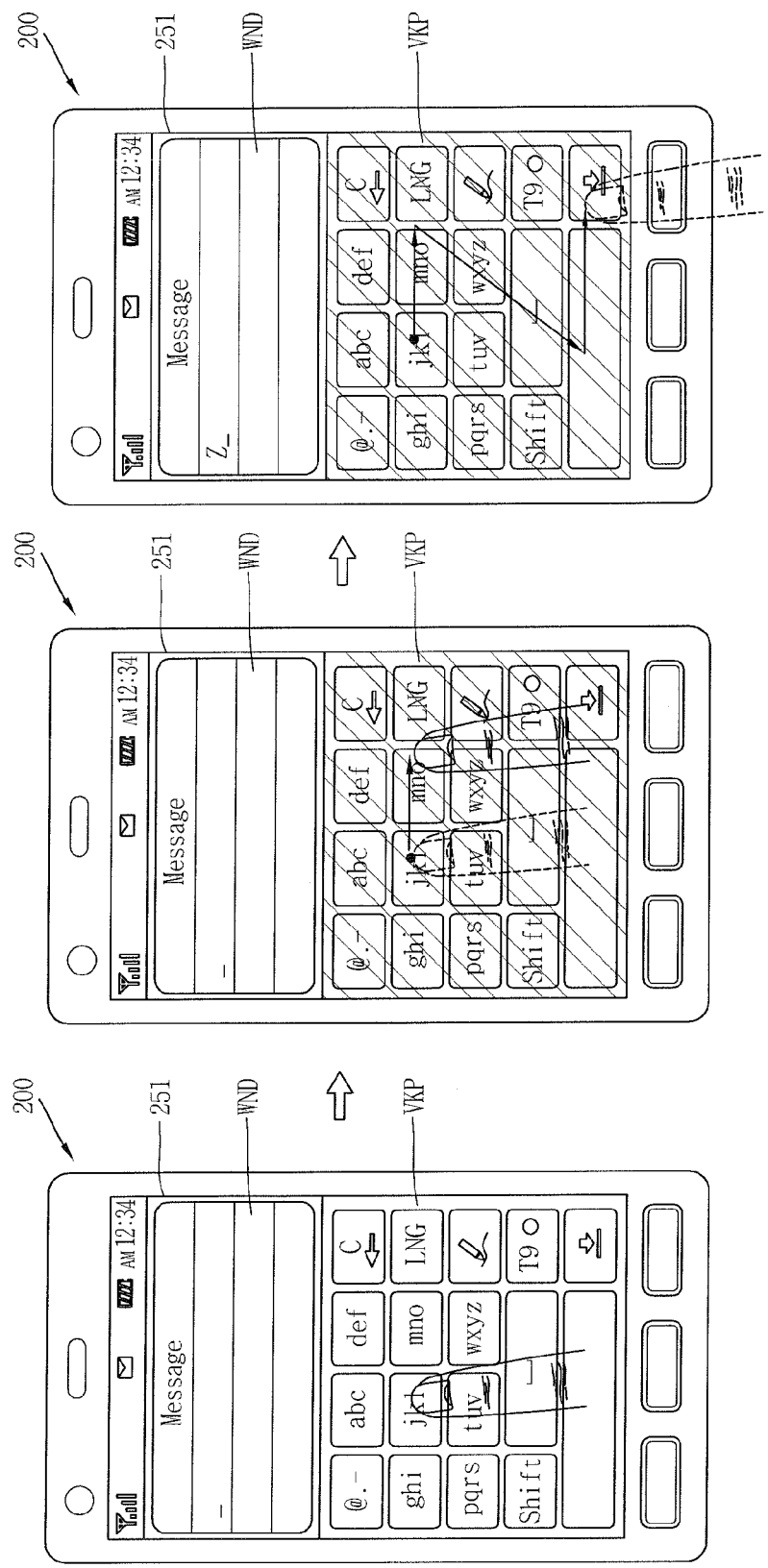
FIGS. 4 and 5 are conceptual views illustrating operation examples of a mobile terminal according to the control method illustrated in FIG. 3.
Figure 5:
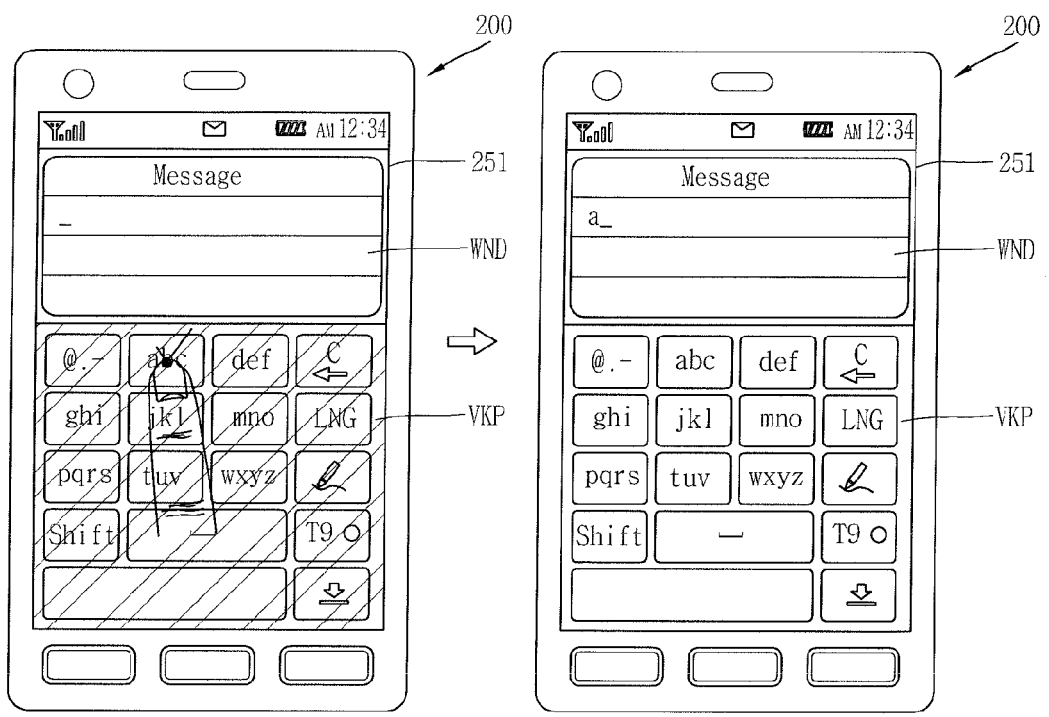

FIGS. 4 and 5 are conceptual views illustrating operation examples of a mobile terminal according to the control method illustrated in FIG. 3. In operation examples described below, a display unit 251 may display an output window (WND) and a virtual keypad (VKP). The sensing unit (not shown) may sense an input performed by a touch operation onto the virtual keypad (VKP). The detailed control operation will be described with reference to the following drawings.

Referring to FIG. 4, it is illustrated an example of implementing a handwriting mode (switching from a key input mode to a handwriting mode). The sensing unit may sense a drag across the virtual keypad (VKP). When a drag across the virtual keypad (VKP) is sensed, the controller may implement a handwriting mode.

When the handwriting mode is carried out, a semi-transparent window may be displayed on the virtual keypad (VKP). This means that the virtual keypad (VKP) and the semi-transparent window may be displayed together in an overlapped manner.

Furthermore, when the handwriting mode is carried out, a trace of the drag may be displayed on the virtual keypad (VKP) or semi-transparent window. The trace of the drag may correspond to a path along which the user's finger is moved on the virtual keypad (VKP) while being dragged.

When a drag is completed in the handwriting mode, the trace of the drag may be recognized as a handwriting character. Furthermore, the recognized handwriting character may be displayed on the output window (WND). For example, when the trace of the drag corresponds to character "Z", the character "Z" may be recognized as a handwriting character. Furthermore, the recognized "Z" may be displayed on the output window (WND).

Referring to FIG. 5, it is illustrated an example of releasing a handwriting mode (switching from a handwriting mode to a key input mode). The sensing unit may sense a touch (tap) to the virtual keypad (VKP). When one key input is sensed by a touch to the virtual keypad (VKP), the controller may release the handwriting mode.

When the handwriting mode is released, a character mapping to one key input may be recognized. Furthermore, the recognized character may be displayed on the output window (WND). For example, when a key mapping to "abc" is touched once (tap), character "a" is recognized. Then, the recognized character "a" is displayed on the output window (WND). For another example, when a key mapping to "abc" is touched twice (double tap), character "b" is recognized. Then, the recognized character "b" is displayed on the output window (WND).

Meanwhile, when the handwriting mode is released, a semi-transparent window that has been displayed on the virtual keypad (VKP) may be disappeared.

As described above, according to an embodiment of the present invention, even if an input mode switch command is not separately given by the user, the input mode may be switched based on an input (tap, drag, etc.) to the virtual keypad displayed on the display unit while at the same time a character corresponding to an input to the virtual keypad is recognized. As a result, the user's manipulation may be reduced in entering characters, thereby enhancing the user's convenience.

Figure 6:
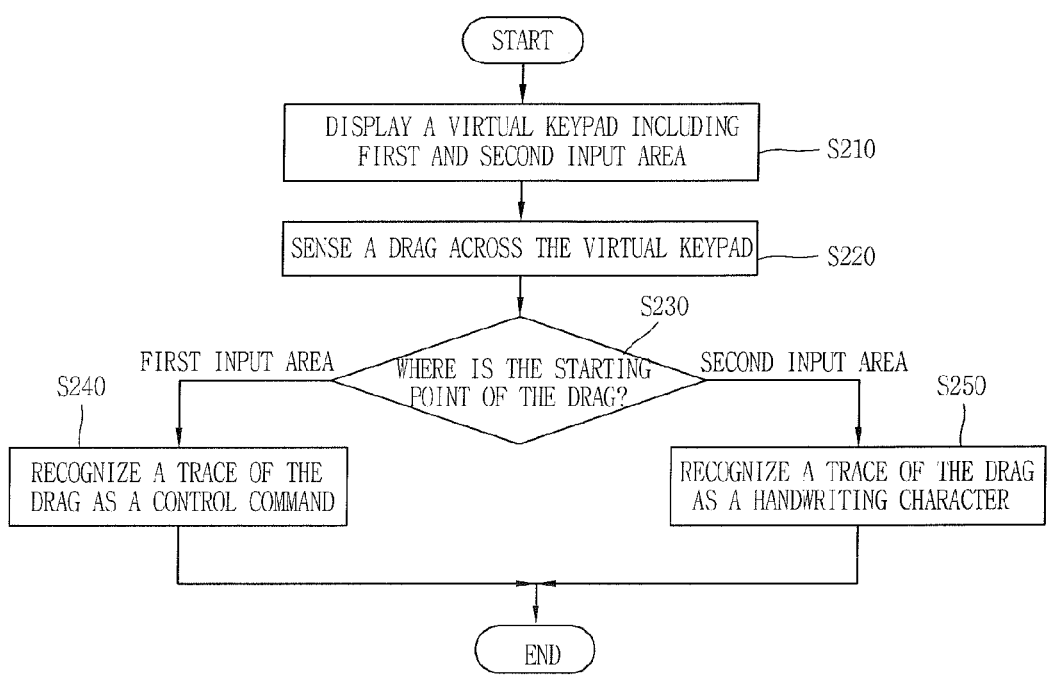
FIG. 6 is a flow chart for explaining another embodiment of a control method applied to the mobile terminal illustrated in FIG. 1.

FIG. 6 is a flow chart for explaining another embodiment of a control method applied to the mobile terminal 100 illustrated in FIG. 1.

Referring to FIG. 6, a control method according to another embodiment may include the step of displaying a virtual keypad on the display unit 151 (refer to FIG. 1) (S210). Here, the virtual keypad may include a first and a second input area. The first input area may include keys located at an edge within the virtual keypad, and the second input area may include keys located at an inner side of the first region. Hereinafter, the redundant description that has been made in a control method illustrated in FIG. 3 will be omitted.

Next, the step of sensing a drag across the virtual keypad (S220) is progressed. Then, when a drag across the virtual keypad is sensed, the step of detecting a starting point of the drag (S230) is progressed.

As a result of the detection, when the drag is started in a first input area of the virtual keypad, the step of recognizing a trace of the drag as a control command (S240) is progressed. On the contrary, when the drag is started in a second input area of the virtual keypad, the step of recognizing a trace of the drag as a handwriting character (S250) is progressed.

In this manner, according to a control method according to another embodiment of the present invention, a virtual keypad may be divided into a plurality of input areas, and a control command or handwriting mode can be carried out according to in which region a drag across the virtual keypad is started.

FIGS. 7A through 12 are conceptual views illustrating operation examples of a mobile terminal 300 according to the control method illustrated in FIG. 6. In the operation examples described below, the display unit 351 may display a output window (WND) and a virtual keypad (VKP).

As described above, the virtual keypad (VKP) may include a first and a second input area (IA1, IA2). The first input area (IA1) may include keys located at an edge of the virtual keypad (VKP). The second input area (IA2) may include keys located at an inner side of the first input area (IA1). For example, keys mapping to "abc", "def", and the like may be included in the first input area (IA1), and keys mapping to "jkl", "mno", and the like may be included in the second input area (IA2).

The sensing unit (not shown) may sense an input by a touch operation onto the virtual keypad (VKP). The controller (not shown) may perform a control operation according to the sensed input. The detailed control operation will be described below with reference to the following drawings.

Figure 7A:
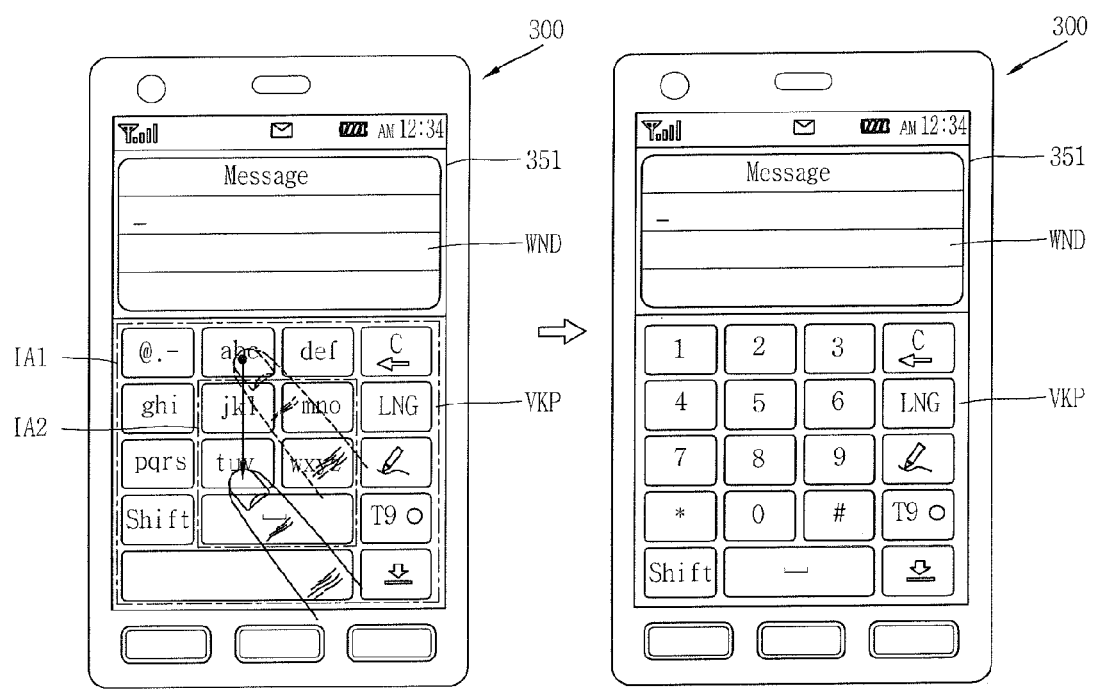
FIGS. 7A through 12 are conceptual views illustrating operation examples of a mobile terminal according to the control method illustrated in FIG. 6.
Figure 7B:
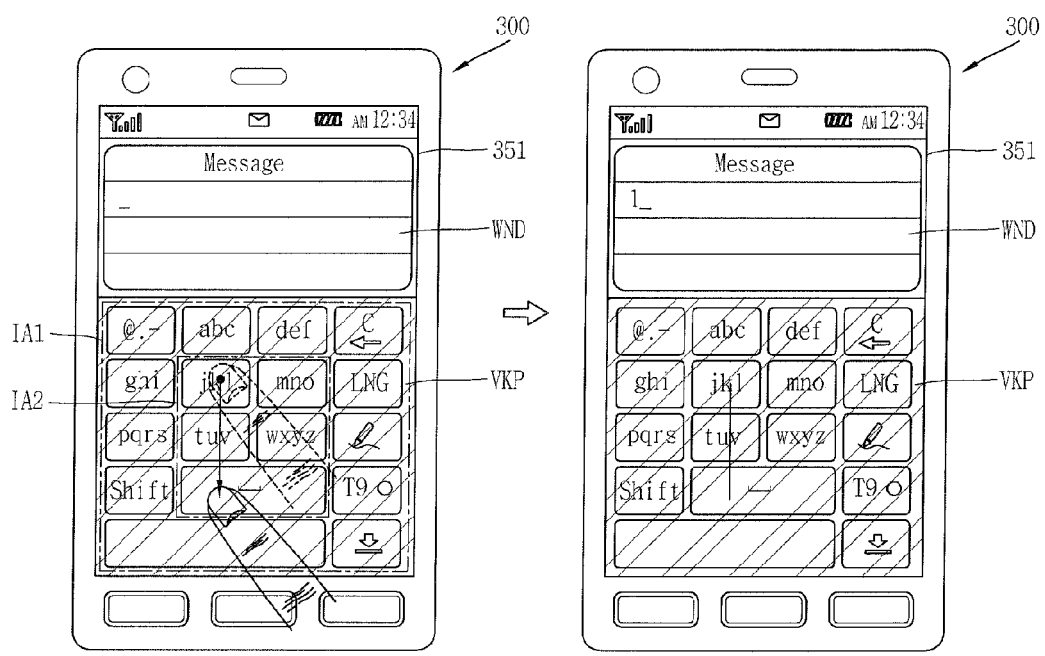

Each drag illustrated in FIGS. 7A and 7B has the same pattern, but has a different starting position. For example, FIG. 7A illustrates a case where a drag having a first pattern (hereinafter, referred to as a "first drag") is started in the first input area (IA1), and FIG. 7B illustrates a case where a first drag is started in the second input area (IA2). A trace (first pattern) of the first drag illustrated herein may illustratively correspond to numeral "1".

Referring to FIG. 7A, when a first drag is started in the first input area (IA1), a trace of the first drag may be recognized as a first control command. Furthermore, the virtual keypad (VKP) may be changed to a numerical keypad in response to the first command. This means that a numerical input mode is carried out when a first control command is recognized, and numerals are mapped to keys of the virtual keypad (VKP).

For example, when a first control command is recognized, English characters mapping to keys on the virtual keypad (VKP) may be changed to numerals.

Referring to FIG. 7B, when a first drag is started in the second input area (IA2), a handwriting mode is carried out. At this time, a semi-transparent window may be displayed in an overlapped manner on the virtual keypad (VKP).

When a first drag is completed in the handwriting mode, a trace of the first drag may be recognized as a handwriting character. At this time, the trace of the first drag may be displayed on the virtual keypad (VKP). Furthermore, the recognized character, for example, numeral "1" may be displayed on the output window (WND).

Figure 8A:
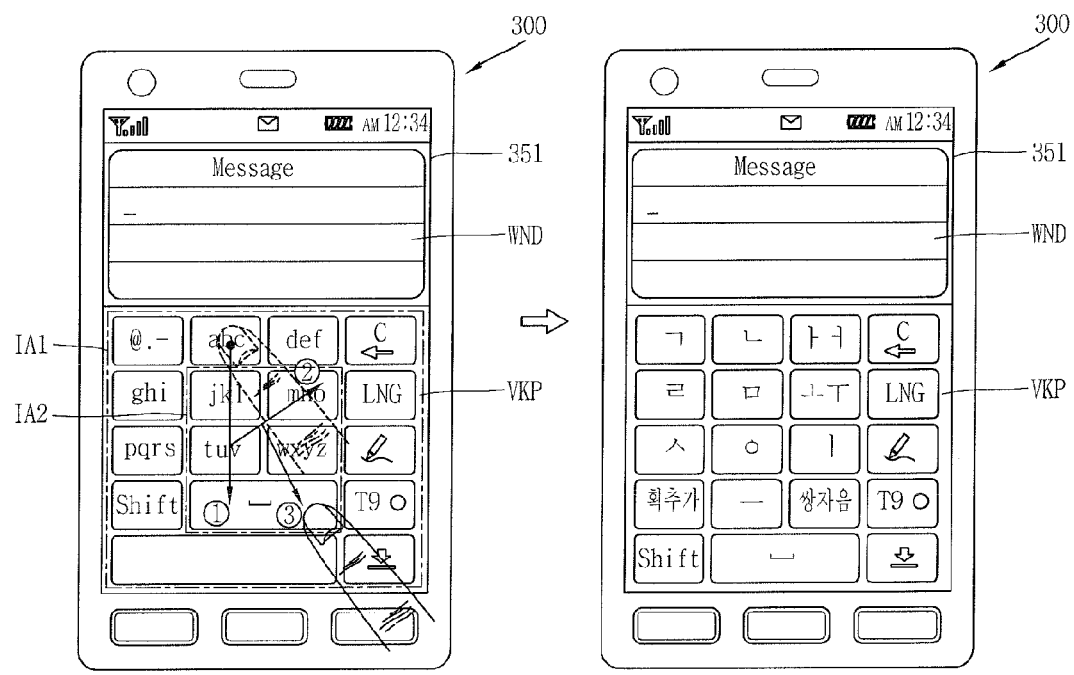
Figure 8B:
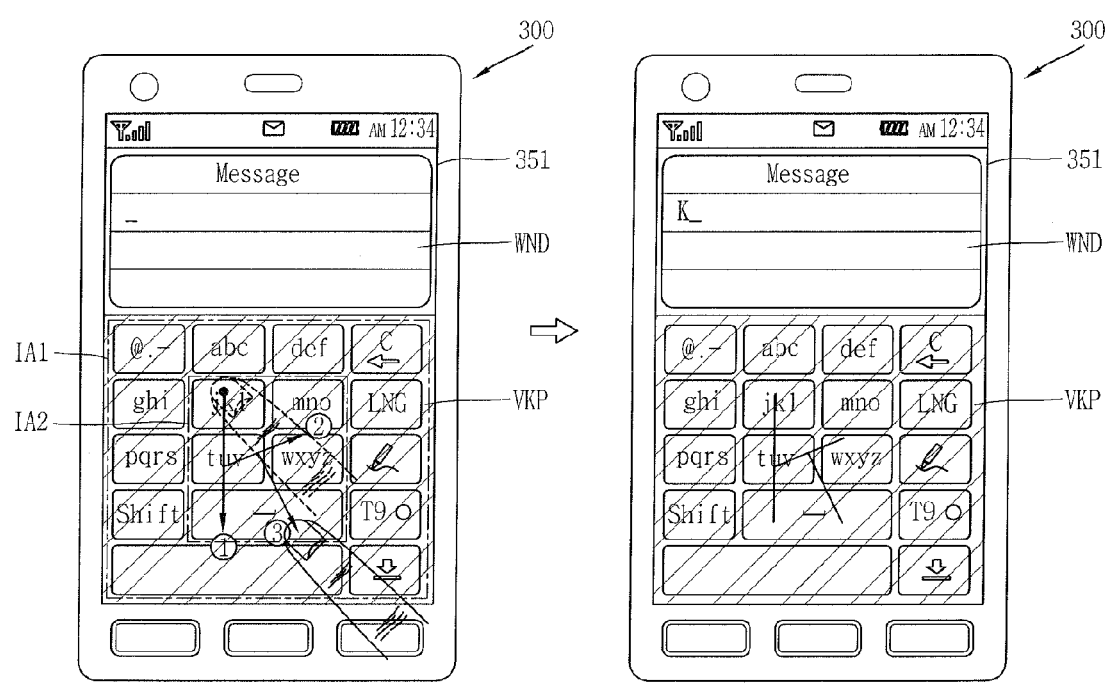

Each drag illustrated in FIGS. 8A and 8B has the same pattern, but has a different starting position. For example, FIG. 8A illustrates a case where a drag having a second pattern (hereinafter, referred to as a "second drag") is started in the first input area (IA1), and FIG. 8B illustrates a case where a second drag is started in the second input area (IA2). A trace (second pattern) of the second drag illustrated herein may illustratively correspond to English character "K".

Referring to FIG. 8A, when a second drag is started in the first input area (IA1), a trace of the second drag may be recognized as a second control command. Furthermore, the virtual keypad (VKP) may be changed to a Korean keypad in response to the second command. This means that a Korean input mode is carried out when a second control command is recognized, and Korean characters are mapped to keys of the virtual keypad (VKP).

For example, when a second control command is recognized, English characters mapping to keys on the virtual keypad (VKP) may be changed to Korean characters.

Referring to FIG. 8B, when a second drag is started in the second input area (IA2), a handwriting mode is carried out. At this time, a semi-transparent window may be displayed in an overlapped manner on the virtual keypad (VKP).

When a second drag is completed in the handwriting mode, a trace of the second drag may be recognized as a handwriting character. At this time, the trace of the second drag may be displayed on the virtual keypad (VKP). Furthermore, the recognized character, for example, English character "K" may be displayed on the output window (WND).

Figure 9A:
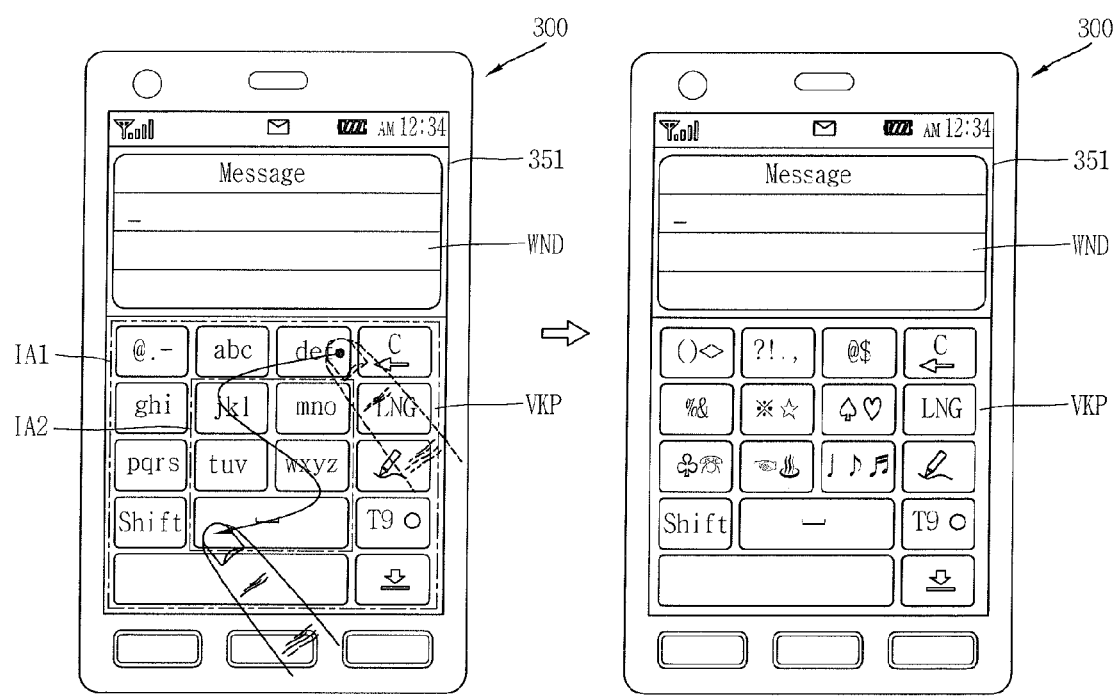
Figure 9B:
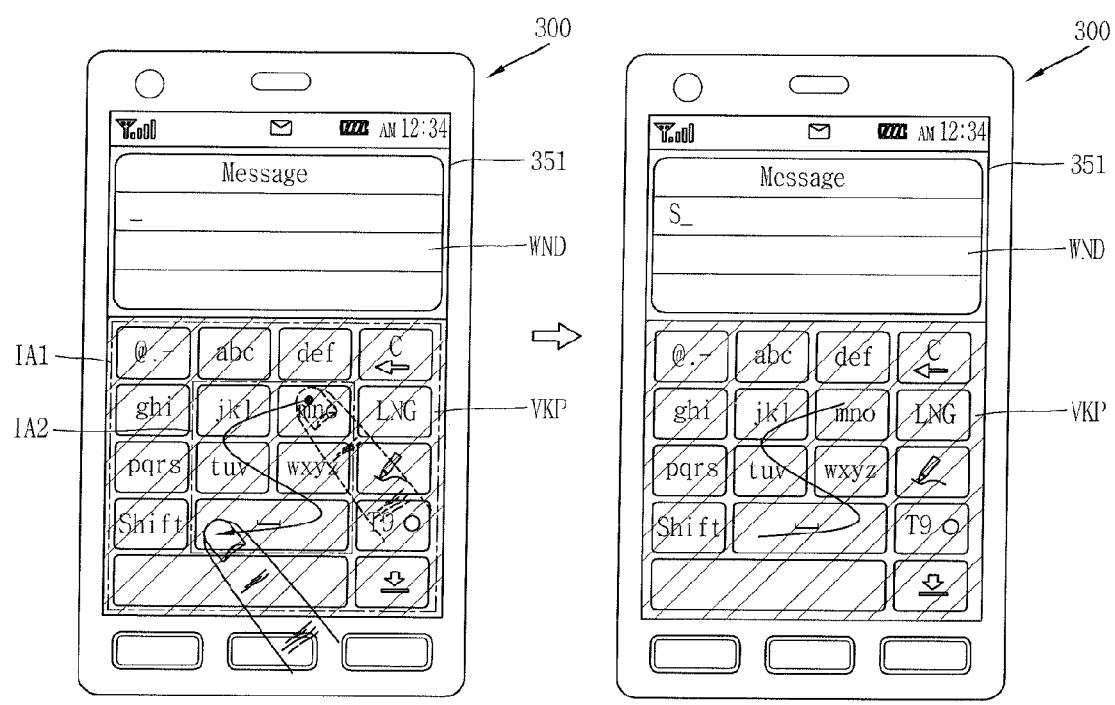

Each drag illustrated in FIGS. 9A and 9B has the same pattern, but has a different starting position. For example, FIG. 9A illustrates a case where a drag having a third pattern (hereinafter, referred to as a "third drag") is started in the first input area (IA1), and FIG. 9B illustrates a case where a third drag is started in the second input area (IA2). A trace (third pattern) of the third drag illustrated herein may illustratively correspond to English character "5".

Referring to FIG. 9A, when a third drag is started in the first input area (IA1), a trace of the third drag may be recognized as a third control command. Furthermore, the virtual keypad (VKP) may be changed to a symbol keypad in response to the third command. This means that a symbol input mode is carried out when a third control command is recognized, and numerals are mapped to keys of the virtual keypad (VKP).

For example, when a first control command is recognized, as illustrated in the drawing, the characters mapping to keys on the virtual keypad (VKP) may be changed from English characters to symbols.

Referring to FIG. 9B, when a third drag is started in the second input area (IA2), a handwriting mode is carried out. At this time, a semi-transparent window may be displayed in an overlapped manner on the virtual keypad (VKP).

When a third drag is completed in the handwriting mode, a trace of the third drag may be recognized as a handwriting character. At this time, the trace of the third drag may be displayed on the virtual keypad (VKP). Furthermore, the recognized character, for example, English character "S" may be displayed on the output window (WND).

Figure 10A:
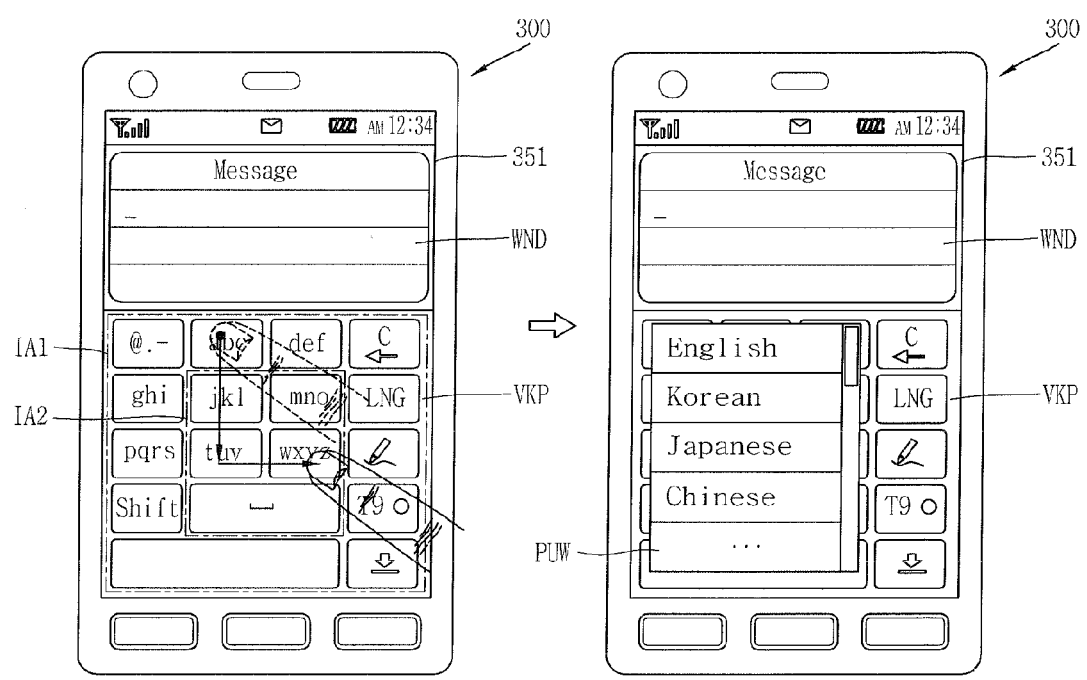
Figure 10B:
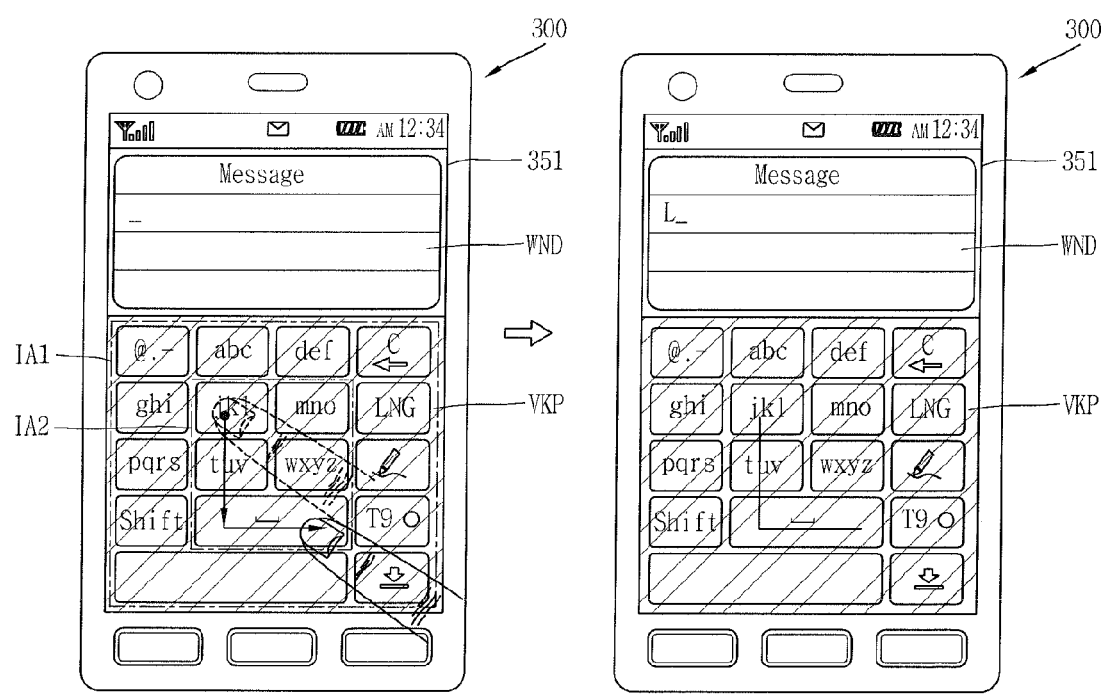

Each drag illustrated in FIGS. 10A and 10B has the same pattern, but has a different starting position. For example, FIG. 10A illustrates a case where a drag having a fourth pattern (hereinafter, referred to as a "fourth drag") is started in the first input area (IA1), and FIG. 10B illustrates a case where a fourth drag is started in the second input area (IA2). A trace (fourth pattern) of the fourth drag illustrated herein may illustratively correspond to English character "S".

Referring to FIG. 10A, when a fourth drag is started in the first input area (IA1), a trace of the fourth drag may be recognized as a fourth control command. The controller (not shown) may generate list information on input modes in response to the fourth control command. Furthermore, the display unit 351 may display a popup window (PUW) showing list information provided from the controller.

For example, the list information may include a list for a plurality of languages such as English, Korean, Japanese, Chinese, and the like. When any one of the plurality of languages, an input mode corresponding to the selected language may be carried out. Furthermore, characters for the selected language may be mapped to keys on the virtual keypad (VKP).

Referring to FIG. 10B, when a fourth drag is started in the second input area (IA2), a handwriting mode is carried out. At this time, a semi-transparent window may be displayed in an overlapped manner on the virtual keypad (VKP).

When a fourth drag is completed in the handwriting mode, a trace of the fourth drag may be recognized as a handwriting character. At this time, the trace of the fourth drag may be displayed on the virtual keypad (VKP). Furthermore, the recognized character, for example, English character L" may be displayed on the output window (WND).

Figure 11:
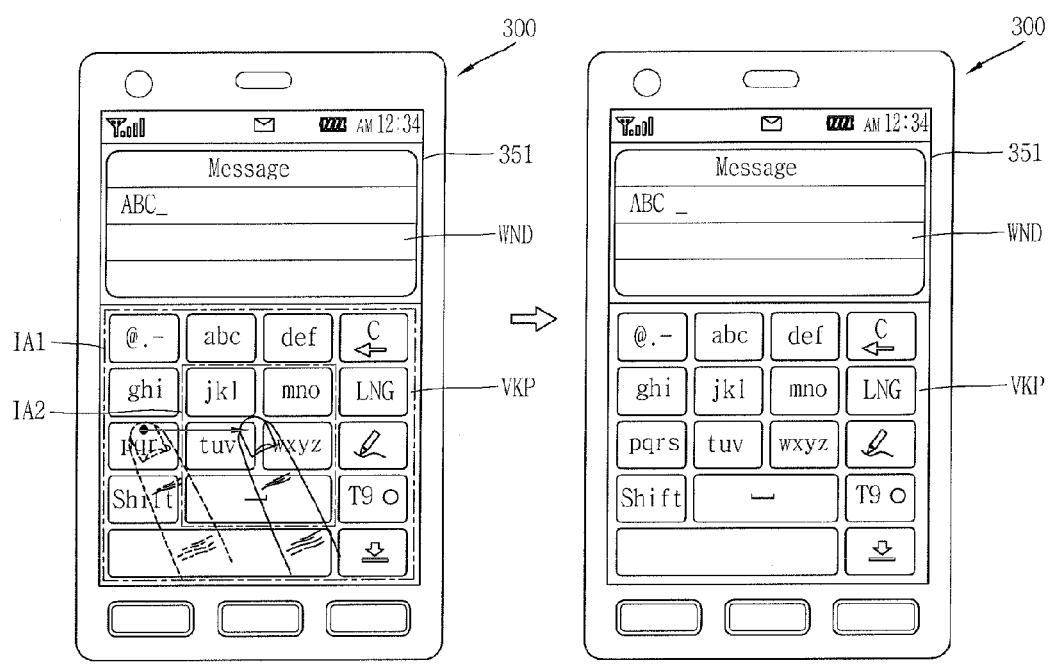

FIG. 11 illustrates a case where a drag having a fifth pattern (hereinafter, referred to as a "fifth drag") is started in the first input area (IA1).

Referring to FIG. 11, a trace of the fifth drag may correspond to a straight line which is illustratively drawn from the left side to the right side. When a fifth drag is started in the first input area (IA1), a trace of the fifth drag may be recognized as a fifth control command.

The controller (not shown) may perform a control operation for allowing a blank to be inserted into a cursor position on the output window (WND) in response to the fifth control command as illustrated in the drawing. For example, when a fifth control command is recognized in a state that "ABC" is displayed on the popup window (PUW) and the cursor is located in front of "ABC", a blank can be inserted in front of "ABC".

Figure 12:
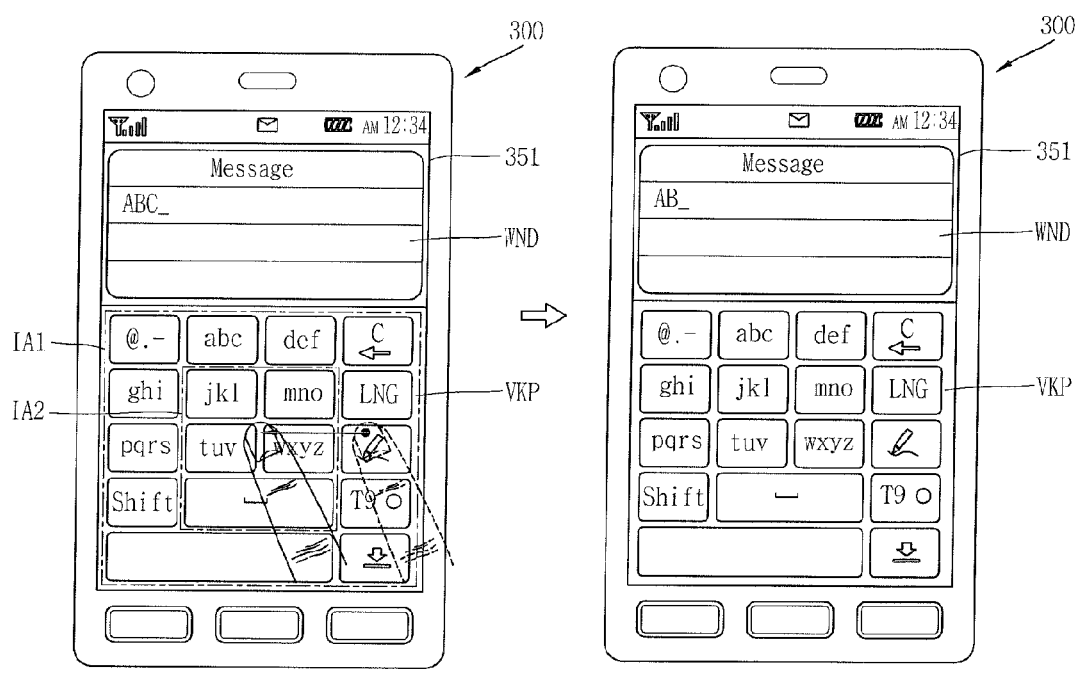

FIG. 12 illustrates a case where a drag having a sixth pattern (hereinafter, referred to as a "sixth drag") is started in the first input area (IA1).

Referring to FIG. 12, a trace of the sixth drag may correspond to a straight line which is illustratively drawn from the right side to the left side. When a sixth drag is started in the first input area (IA1), a trace of the sixth drag may be recognized as a sixth control command.

The controller (not shown) may perform a control operation for allowing a cursor to be moved backward while deleting a character located at the back of the cursor on the output window (WND) in response to the sixth control command as illustrated in the drawing. For example, when a sixth control command is recognized in a state that "ABC" is displayed on the popup window (PUW) and the cursor is located in front of "ABC", the cursor can be moved backward by one step while deleting character "C".

As described above, according to another embodiment of the present invention, when a drag across the virtual keypad is started in the first input area, a control command associated with inputting character may be carried out. In this case, the executed control command may be determined based on a trace of the drag. On the contrary, when a drag across the virtual keypad is started in the second input area, a handwriting character corresponding to the trace of the drag may be recognized. Accordingly, it may be possible to reduce the user's manipulation for switching an input mode for the mobile terminal.

According to an embodiment of the present invention, the foregoing method may be implemented as codes readable by a processor on a medium written by the program. Examples of the processor-readable media may include ROM, RAM, CD-ROM, magnetic tape, floppy disk, and optical data storage device, and the like, and also include a device implemented in the form of a carrier wave (for example, transmission via the Internet).

The configurations and methods according to the above-described embodiments will not be applicable in a limited way to a mobile terminal disclosed herein, and all or part of each embodiment may be selectively combined and configured to make various modifications thereto.

What is claimed is:

1. A mobile terminal, comprising:
 a display configured to display information; and
 a controller configured to:
  cause the display to display a virtual keypad comprising a plurality of keys and sectioned into at least a first input area and a second input area
  receive a drag input applied to the virtual keypad, the drag input having a starting point in the first input area or the second input area;
  perform either a first function or a second function related to the virtual keypad based on whether the starting point is in the first input area or the second input area;
  cause the display to change a character set mapping of the displayed plurality of keys to another character set mapping when the starting point is in the first input area;
  switch the mobile terminal from a key input mode to a handwriting mode when the starting point is in the second input area and recognize a trace of the drag input as a handwritten character input; and
  cause the display to maintain a displayed position of the plurality of keys during the handwriting mode.
 the first input area comprises at least a first key of the plurality of keys, the at least first key located along an edge of the virtual keypad; and
 the second input area comprises at least a second key of the plurality of keys, the second input area located on the inner side of the first input area and located away from edges of the virtual keypad.

2. The mobile terminal of claim 1, wherein the controller is further configured to:
 receive a touch input on a touched key of the plurality of keys as an input of a character corresponding to the touched key when the mobile terminal is in the handwriting mode; and switch the mobile terminal from the handwriting mode to the key input mode in response to the touch input to the touched key.

3. The mobile terminal of claim 1, wherein the controller is further configured to recognize a trace of the detected drag input as a control command when the starting point is in the first input area.

4. The mobile terminal of claim 3, wherein the controller is further configured to generate list information related to input modes based on the control command.

5. The mobile terminal of claim 4, wherein:
the another character set mapping of the plurality of keys is based on a selection of an input mode from the generated list information.

6. The mobile terminal of claim 1, wherein the controller is further configured to cause the display to display:
a semi-transparent window on the virtual keypad when the mobile terminal is in the handwriting mode; and
the recognized trace on the displayed semi-transparent window.

7. The mobile terminal of claim 1, wherein the controller is further configured to cause the display to display the recognized trace on at least one of the plurality of keys when the mobile terminal is switched to the handwriting mode.

8. A method of controlling a mobile terminal, the method comprising:
displaying a virtual keypad on a display, the virtual keypad comprising a plurality of keys and sectioned into at least a first input area and a second input area;
receiving a drag input applied to the virtual keypad, the drag input having a starting point in the first input area or the second input area;
performing either a first function or a second function related to the virtual keypad based on whether the starting point is in the first input area or the second input area;
changing a character set mapping of the displayed plurality of keys to another character set mapping when the starting point is in the first input area;
switching the mobile terminal from a key input mode to a handwriting mode when the starting point is in the second input area and recognizing a trace of the detected drag input as a handwritten character input; and
maintaining a displayed position of the plurality of keys during the handwriting mode.
the first input area comprises at least a first key of the plurality of keys, the at least first key located along an edge of the virtual keypad; and
the second input area comprises at least a second key of the plurality of keys, the second input area located on the inner side of the first input area and located away from edges of the virtual keypad.

9. The method of claim 8, further comprising:
receiving a touch input on a touched key of the plurality of keys as an input of a character corresponding to the touched key when the mobile terminal is in the handwriting mode; and
switching the mobile terminal from the handwriting mode to the key input mode in response to the touch input to the touched key.

10. The method of claim 8, method further comprising:
recognizing a trace of the detected drag input as a control command if the starting point is in the first input area.

11. The method of claim 10, further comprising:
generating list information related to input modes based on the control command.

12. The method of claim 11, wherein:
the another character set mapping of the plurality of keys is based on a selection of an input mode from the generated list information.

13. The method of claim 8, further comprising:
displaying a semi-transparent window on the virtual keypad when the mobile terminal is in the handwriting mode; and
displaying the recognized trace on the displayed semi-transparent window.

14. The method of claim 8, further comprising displaying the recognized trace of the drag input on at least one of the plurality of keys when the mobile terminal is switched to the handwriting mode.

* * * * *